(12) United States Patent
Mullins

(10) Patent No.: US 11,281,003 B2
(45) Date of Patent: Mar. 22, 2022

(54) NEAR EYE DYNAMIC HOLOGRAPHY

(71) Applicant: Dualitas Ltd, Milton Keynes (GB)

(72) Inventor: Brian Mullins, Los Angeles, CA (US)

(73) Assignee: DUALITAS LTD, Milton Keynes (GB)

( * ) Notice: Subject to any disclaimer, the term of this patent is extended or adjusted under 35 U.S.C. 154(b) by 297 days.

(21) Appl. No.: 16/067,377

(22) PCT Filed: Dec. 22, 2016

(86) PCT No.: PCT/GB2016/054045
§ 371 (c)(1),
(2) Date: Jun. 29, 2018

(87) PCT Pub. No.: WO2017/115081
PCT Pub. Date: Jul. 6, 2017

(65) Prior Publication Data
US 2019/0025583 A1    Jan. 24, 2019

Related U.S. Application Data

(60) Provisional application No. 62/273,030, filed on Dec. 30, 2015.

(51) Int. Cl.
*G02B 27/01* (2006.01)
*G02B 5/30* (2006.01)
(Continued)

(52) U.S. Cl.
CPC ........... *G02B 27/0103* (2013.01); *G02B 5/30* (2013.01); *G02B 27/0172* (2013.01);
(Continued)

(58) Field of Classification Search
CPC .............. G02B 27/00; G02B 27/0093; G02B 27/0103; G02B 27/0172; G02B 27/01;
(Continued)

(56) References Cited

U.S. PATENT DOCUMENTS 5,991,087 A    11/1999   Rallison
2003/0090752 A1    5/2003   Rosenberger
(Continued)

FOREIGN PATENT DOCUMENTS

| CN | 105116546 | 12/2014 |
|---|---|---|
| DE | 10 2007 012865 | 9/2008 |

(Continued)

OTHER PUBLICATIONS

International Search Report and Written Opinion dated Mar. 31, 2017 for International Application No. PCT/GB2016/054045 filed Dec. 22, 2016, 13 pages.

*Primary Examiner* — Jie Lei
(74) *Attorney, Agent, or Firm* — McDonnell Boehnen Hulbert & Berghoff LLP

(57) ABSTRACT

A display device accesses holographic data corresponding to an image. A laser source generates a laser light. A SLM (Spatial Light Modulator) receives the laser light and modulate the laser light based on the holographic data of the image. A partially transparent reflective lens receives the modulated laser light and reflects the modulated laser light towards an eye of a user of the display device. A holographic image is formed in the form of a reconstructed wavefront based on the modulated laser light. The partially transparent reflective lens is disposed adjacent to the eye of the user.

23 Claims, 12 Drawing Sheets

(51) Int. Cl.
*G03H 1/22* (2006.01)
*G02B 27/09* (2006.01)

(52) U.S. Cl.
CPC ....... *G02B 27/0955* (2013.01); *G03H 1/2202* (2013.01); *G03H 1/2205* (2013.01); *G03H 1/2294* (2013.01); *G02B 2027/014* (2013.01); *G02B 2027/0138* (2013.01); *G02B 2027/0174* (2013.01); *G03H 2001/221* (2013.01); *G03H 2001/2284* (2013.01); *G03H 2210/30* (2013.01)

(58) Field of Classification Search
CPC ...... G02B 27/09; G02B 27/0955; G02B 5/30; G02B 2027/0138; G02B 2027/014; G02B 2027/0174; G03H 1/2205; G03H 1/2294; G03H 1/2202; G03H 1/22; G03H 2001/221; G03H 2001/2284; G03H 2210/30
USPC .... 359/13–15, 629–630, 315–318, 237, 239; 345/7–9, 156
See application file for complete search history.

(56) References Cited

U.S. PATENT DOCUMENTS

| | | |
|---|---|---|
| 2005/0041297 A1 | 2/2005 | He et al. |
| 2005/0140644 A1* | 6/2005 | Mukawa ............ G02B 27/0172 345/156 |
| 2006/0279820 A1 | 12/2006 | Riley |
| 2010/0118359 A1 | 5/2010 | Leister |
| 2011/0254916 A1 | 10/2011 | Fan et al. |
| 2013/0208362 A1* | 8/2013 | Bohn ................. G02B 27/017 359/630 |
| 2013/0265622 A1 | 10/2013 | Christmas et al. |
| 2014/0022526 A1 | 1/2014 | Van Eijk et al. |
| 2014/0160543 A1 | 6/2014 | Putilin et al. |
| 2014/0253987 A1 | 9/2014 | Christmas |
| 2015/0009695 A1 | 1/2015 | Christmas et al. |
| 2015/0022526 A1 | 1/2015 | Christmas |
| 2015/0205126 A1* | 7/2015 | Schowengerdt ....... G02C 7/049 345/633 |
| 2015/0346491 A1 | 12/2015 | Christmas et al. |
| 2016/0199935 A1 | 7/2016 | Chen |
| 2017/0075113 A1 | 3/2017 | Wu et al. |
| 2017/0082855 A1 | 3/2017 | Christmas et al. |
| 2017/0115627 A1 | 4/2017 | Christmas et al. |
| 2017/0363869 A1 | 12/2017 | Christmas et al. |
| 2018/0003962 A1* | 1/2018 | Urey .................. G02B 27/0093 |
| 2018/0015672 A1 | 1/2018 | Shusteff |
| 2018/0046138 A1 | 2/2018 | Christmas et al. |
| 2018/0120768 A1 | 5/2018 | Christmas |
| 2018/0188532 A1 | 7/2018 | Christmas et al. |
| 2019/0004476 A1 | 1/2019 | Mullins |
| 2019/0041641 A1 | 2/2019 | Christmas et al. |
| 2019/0064738 A1 | 2/2019 | Cole et al. |
| 2020/0041957 A1 | 2/2020 | Mullins |

FOREIGN PATENT DOCUMENTS

| | | |
|---|---|---|
| EP | 1 798 587 | 6/2007 |
| GB | 2496108 A | 5/2013 |
| GB | 2526275 A | 11/2015 |
| GB | 2554575 A | 4/2018 |
| GB | 2567409 A | 4/2019 |
| GB | 2567410 A | 4/2019 |
| GB | 2569206 A | 6/2019 |
| GB | 2569208 A | 6/2019 |
| WO | 2018078366 A1 | 5/2018 |
| WO | 2018100394 A1 | 6/2018 |
| WO | 2018100397 A1 | 6/2018 |

* cited by examiner

NEAR EYE DYNAMIC HOLOGRAPHY

CROSS-REFERENCE TO RELATED APPLICATIONS

This application is a U.S. national phase application of International Patent Application no. PCT/GB2016/054045, filed Dec. 22, 2016, which claims the benefit of priority of U.S. Provisional Patent Application No. 62/273030, filed Dec. 30, 2015.

FIELD

The present disclosure relates to a display device and method of operating a display device. More specifically, some embodiments relate to a near-eye device, head-mounted display or head-up display, and method of operating the same. Some embodiments relate to a visor for a head-mounted device or an optical combiner for a head-up display. Some embodiments relate to a method of switchably-providing augmented reality. Some embodiments relate to a method of switchably-providing one of augmented reality and virtual reality.

BACKGROUND

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Holography enables three-dimensional (3D) images to be recorded in an optical medium for later reconstruction and display. Typically, a hologram is recorded by optical interference of two coherent laser beams in a film or a grating. As such, the laser recording imparts static optical properties such as fixed depth encoded lights in the grating. The characteristics of the grating do not change once the recording is performed. As such, static optical properties of gratings can be difficult to use in Augmented Reality (AR) devices since the user's relative position is dynamic. AR devices allow users to observe a scene while simultaneously seeing relevant virtual content that may be aligned to items, images, objects, or environments in the field of view of the device or user. However, the user may move the devices relative to the items and stationary objects in space. Since the depth of field for the virtual content is fixed based on the previously recorded grating, the user may perceive a disparity between the real object and the virtual content.

Computer-generated holography may numerically simulate the interference process. A computer-generated hologram, "CGH", may be calculated by a technique based on a mathematical transformation such as a Fresnel or Fourier transform. These types of holograms may be referred to as Fresnel or Fourier holograms. A Fourier hologram may be considered a Fourier domain representation of the object or a frequency domain representation of the object. A CGH may also be calculated by coherent ray tracing or a point cloud technique, for example.

A CGH may be encoded on a spatial light modulator, "SLM", arranged to modulate the amplitude and/or phase of incident light. Light modulation may be achieved using electrically-addressable liquid crystals, optically-addressable liquid crystals or micro-mirrors, for example.

The SLM may comprise a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The SLM may be reflective meaning that modulated light is output from the SLM in reflection. The SLM may equally be transmissive meaning that modulated light is output from the SLM is transmission.

A holographic projector for imaging may be provided using the described technology. Such projectors have found application in head-up displays, "HUD", and head-mounted displays, "HMD", including near-eye devices, for example.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

SUMMARY

Figure 1:
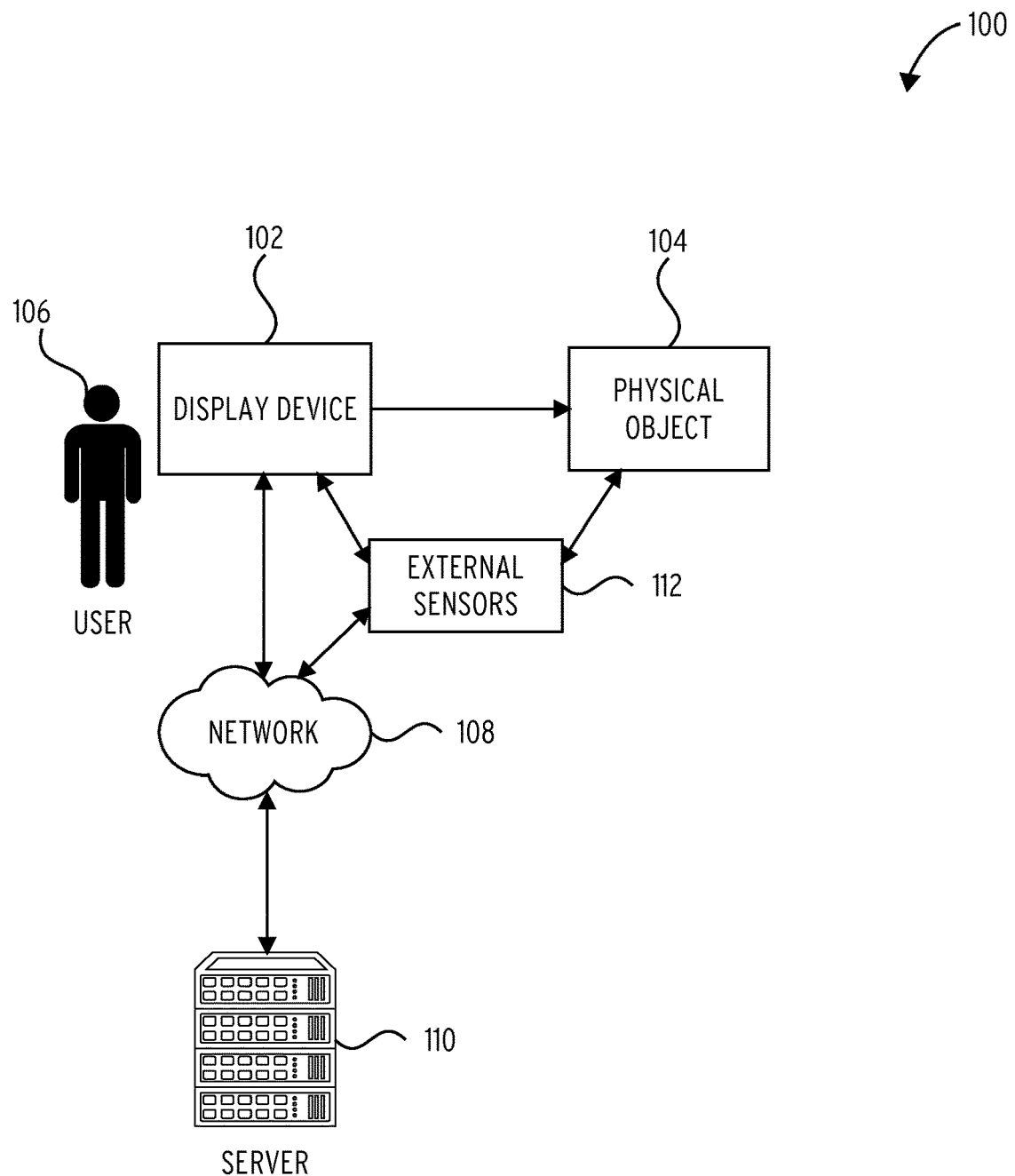
FIG. 1 is a block diagram illustrating an example of a network environment suitable for a display device, according to some example embodiments.

Example methods and systems are directed to dynamic holography for near eye application of display devices. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

LCOS-SLM (Liquid Crystal on Silicon Spatial Light Modulator) is used for modulating a laser light by shifting a phase and/or amplitude of the laser light. The resulting wavefront reconstruction from the modulated laser light dynamically generates holograms in "near-eye" applications. Prior technology requires the use of mirror and projection system to create holographic displays by projecting the holographic images onto a surface. In contrast, the present system allows for dynamically generating holograms that are formed in front or at the eyes of the user or at a remote projection surface.

In some embodiments, a display device may include a hardware processor configured to access (such as calculate or retrieve from a repository or memory) encoded holographic data of an image; a laser source configured to generate laser light; a LCOS-SLM (Liquid Crystal on Silicon Spatial Light Modulator) configured to receive the laser light and modulate the laser light based on (or in accordance with) the encoded holographic data of the image; and a partially transparent reflective lens configured to receive the modulated laser light, to reflect the modulated laser light towards an eye of a user of the display device, and to form a holographic image viewable by the user.

In some embodiments, the holographic projector comprises a light receiving surface—such as a screen or diffuser—and the holographic image is formed on the light receiving surface. In some embodiments, the partially transparent reflective lens is arranged to at least partially image the holographic image formed on the light receiving surface. In some embodiments, imaging of the holographic image formed on the light receiving surface may also be performed, at least partially, by the lens in the viewer's eye.

In some embodiments, the encoded holographic data is a Fourier transform of image data corresponding to the image. That is, in some embodiments, the hologram is a Fourier (far-field) hologram. In some embodiments, the partially transmissive reflective lens is configured (e.g. positioned) to perform a Fourier transform of the modulated laser light. In other embodiments, the eye of the viewer performs a Fourier transform of the modulated light. In some embodiments, the partially transmissive reflective lens and eye of the viewer collectively perform the Fourier transform.

In some embodiments, a display device may include a hardware processor configured to access encoded depth data of an image; a laser source configured to generate a laser light representative of the image (e.g. using a physical mask or shaped aperture or array of apertures); a LCOS-SLM (Liquid Crystal on Silicon Spatial Light Modulator) configured to receive the laser light and modulate the laser light based on the encoded depth data of the image; and a partially transparent reflective lens configured to receive the modulated laser light, to reflect the modulated laser light towards an eye of a user of the display device, and to form a holographic image at the location of the lens as viewed by the user. In these embodiments, the pixels of the LCOS-SLM may be configured to provide a lensing effect or lensing function to received light such as the light representative of the image. That is, the pixels of the LCOS-SLM may be configured such that the LCOS-SLM functions as a lens, optionally, a phase-only lens—for example, a lens for the light representative of the image. In other words, in these embodiments, the SLM is configured to function as a lens and focus received light such as the light representative of the image.

In some embodiments, the partially transparent reflective lens is disposed adjacent to the eye of the user. The partially transparent reflective lens may include a parabolic lens. The partially transparent reflective lens may include a concave side, a convex side, and a partially reflective layer applied to the concave side. The LCOS-SLM directs the modulated laser light to the partially reflective layer on the concave side of the parabolic lens.

In some embodiments, the partially transparent reflective lens combines an external visible light reflected off a physical object that is within a field of a view of the display device with the modulated laser light. The display device may further include an outside layer applied to the concave side of the parabolic lens. The outside layer may include a polarized element configured to form a transparent element or opaque element in response an electrical signal applied to the polarized element. The electrical signal is based on an identification of a physical object within the field of view of the display device. The electrical signal is based on an identification of a virtual application mode or an augmented or mixed reality mode. The virtual application mode corresponds to the opaque element. The augmented or mixed reality mode corresponds to the transparent element.

In some embodiments, such a display device may further include a display controller coupled to the processor, the laser source, the lens controller, and the LCOS-SLM. The display controller configured to: receive the holographic data of the image (such as, holographic data corresponding to or representative of the image) from the processor, generate a first control signal for the laser source, generate a second control signal for the LCOS-SLM based on (such as, corresponding to) the holographic data of the image, and generate a third control signal for the lens controller based on the identification of (such as, by user input) the virtual application mode or the augmented or mixed reality mode.

In other embodiments, such a display device may further include a display controller coupled to the processor, the laser source, the lens controller, and the LCOS-SLM. The display controller configured to: receive the image and the encoded depth data of the image from the processor, generate a first control signal to the laser source based on the image, generate a second control signal to the LCOS-SLM based on the encoded depth data of the image, and generate a third control signal to the lens controller based on the identification of the virtual application mode or the augmented or mixed reality mode.

In some embodiments, such a display device may further include a transparent waveguide; the first optical coupler configured to receive the modulated laser light; the transparent waveguide configured to transmit the modulated laser light from the first optical coupler to the second optical coupler; and the second optical coupler configured to direct the modulated laser light towards the eye of the user, and to form the holographic image towards the eye of the user based on the modulated laser light.

In some embodiments, the transparent waveguide may include a first optical coupler at a first end and a second optical coupler at a second end. The transparent waveguide is disposed adjacent to the eye of the user. The hardware processor may include, an augmented reality application configured to: identify a physical object captured by a camera of the display device, retrieve augmented reality content associated with the physical object, identify a depth of the physical object, and/or encode a hologram including a depth of the augmented reality content (that is, a component which determines the depth location of the augmented reality content) based on the depth of the physical object.

In some embodiments, the image may include the augmented reality content. The encoded hologram corresponding to the image may include a holographic component representative of the depth of the physical object as perceived from the display device. More specifically, the encoded hologram corresponding to the image may include a holographic data component representative of the depth of the physical object as perceived from the display device. For example, the hologram may include a holographic data component providing a lensing function having a focal length substantially equal to the perceived depth of the physical object.

In some embodiments, the modulated laser light is phase-modulated laser light. In these embodiments, the LCOS-SLM is arranged to spatially modulate phase-only. In some embodiments, the modulated laser light may include a combination of at least a spatially modulated phase-only light and a spatially modulated amplitude-only light.

The term "hologram" is used to refer to the recording which contains amplitude and/or phase information about the object. The term "holographic reconstruction" is used to refer to the optical reconstruction of the object which is formed by illuminating the hologram. The term "replay field" is used to refer to the plane in space where the holographic reconstruction is formed. The terms "image" and "image region" refer to areas of the replay field illuminated by light forming the holographic reconstruction. In embodiments, the "image" may comprise discrete spots which may be referred to as "image pixels".

The terms "hologram of the image" and "holographic data of the image" are used herein to refer to the computer-generated hologram which gives rise to the image when holographically-reconstructed. Specifically, the term "holographic data" is used to refer to the plurality of light modulation values—such as phase-delay values—which may be respectively represented on the pixels of the SLM. The term "encoded" is used merely to reflect that the holographic data represents a hologram—particularly when processed by the SLM. In some embodiments, the term "encoded" further reflects that the hologram is a mathematical transformation of the image—for example, a Fourier transform. It may be said that the "encoded holographic data of the image" is "holographic data representative of the image".

With respect to operation of the SLM, the terms "encoding", "writing" or "addressing" are used to describe the process of providing the plurality of pixels of the SLM with a respect plurality of control values which respectively determine the modulation level of each pixel. It may be said that the pixels of the SLM are configured to "display" a light modulation distribution in response to receiving the plurality of control values.

The term "light" is used herein in its broadest sense. Some embodiments are equally applicable to visible light, infrared light and ultraviolet light, and any combination thereof.

Some embodiments describe 1D and 2D holographic reconstructions by way of example only. In other embodiments, the holographic reconstruction is a 3D holographic reconstruction. That is, in some embodiments, each computer-generated hologram forms a 3D holographic reconstruction.

DETAILED DESCRIPTION OF DRAWINGS

It has been found that a holographic reconstruction of acceptable quality can be formed from a "hologram" containing only phase information related to the original object. Such a holographic recording may be referred to as a phase-only hologram. Some embodiments relate to phase-only holography by way of example only. That is, in some embodiments, the spatial light modulator applies only a phase-delay distribution to incident light. In some embodiments, the phase delay applied by each pixel is multi-level. That is, each pixel may be set at one of a discrete number of phase levels. The discrete number of phase levels may be selected from a much larger set of phase levels or "palette".

In some embodiments, the computer-generated hologram is a Fourier transform of the object for reconstruction. In these embodiments, it may be said that the hologram is a Fourier domain or frequency domain representation of the object. Some embodiments use a reflective SLM to display a phase-only Fourier hologram and produce a holographic reconstruction at a replay field, for example, a light receiving surface such as a screen or diffuser.

A light source, for example a laser or laser diode, is disposed to illuminate the SLM 140 via a collimating lens. The collimating lens causes a generally planar wavefront of light to be incident on the SLM. The direction of the wavefront is off-normal (e.g. two or three degrees away from being truly orthogonal to the plane of the transparent layer). In other embodiments, the generally planar wavefront is provided at normal incidence using a beam splitter, for example. In embodiments, the arrangement is such that light from the light source is reflected off a mirrored rear surface of the SLM and interacts with a phase-modulating layer to form an exit wavefront. The exit wavefront is applied to optics including a Fourier transform lens, having its focus at a screen.

The Fourier transform lens receives a beam of phase-modulated light from the SLM and performs a frequency-space transformation to produce a holographic reconstruction at the screen.

Light is incident across the phase-modulating layer (i.e. the array of phase modulating elements) of the SLM. Modulated light exiting the phase-modulating layer is distributed across the replay field. Notably, in this type of holography, each pixel of the hologram contributes to the whole reconstruction. That is, there is not a one-to-one correlation between specific points on the replay field and specific phase-modulating elements.

In these embodiments, the position of the holographic reconstruction in space is determined by the dioptric (focusing) power of the Fourier transform lens. In some embodiments, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform. However, in other embodiments, the Fourier transform is performed computationally by including lensing data in the holographic data. That is, the hologram includes data representative of a lens as well as data representing the image. It is known in the field of computer-generated hologram how to calculate holographic data representative of a lens. The holographic data representative of a lens may be referred to as a software lens. For example, a phase-only holographic lens may be formed by calculating the phase delay caused by each point of the lens owing to its refractive index and spatially-variant optical path length. For example, the optical path length at the centre of a convex lens is greater than the optical path length at the edges of the lens. An amplitude-only holographic lens may be formed by a Fresnel zone plate. It is also known in the art of computer-generated hologram how to combine holographic data representative of a lens with holographic data representative of the object so that a Fourier transform can be performed without the need for a physical Fourier lens. In some embodiments, lensing data is combined with the holographic data by simple vector addition. In some embodiments, a physical lens is used in conjunction with a software lens to perform the Fourier transform. Alternatively, in other embodiments, the Fourier transform lens is omitted altogether such that the holographic reconstruction takes place in the far-field. In further embodiments, the hologram may include grating data—that is, data arranged to perform the function of a grating such as beam steering. Again, It is known in the field of computer-generated hologram how to calculate such holographic data and combine it with holographic data representative of the object. For example, a phase-only holographic grating may be formed by modelling the phase delay caused by each point on the surface of a blazed grating. An amplitude-only holographic grating may be simply superimposed on an amplitude-only hologram representative of an object to provide angular steering of an amplitude-only hologram.

A Fourier hologram of a 2D image may be calculated in a number of ways, including using algorithms such as the Gerchberg-Saxton algorithm. The Gerchberg-Saxton algorithm may be used to derive phase information in the Fourier domain from amplitude information in the spatial domain (such as a 2D image). That is, phase information related to the object may be "retrieved" from intensity, or amplitude, only information in the spatial domain. Accordingly, a phase-only Fourier transform of the object may be calculated.

In some embodiments, a computer-generated hologram is calculated from amplitude information using the Gerchberg-Saxton algorithm or a variation thereof. The Gerchberg Saxton algorithm considers the phase retrieval problem when intensity cross-sections of a light beam, $I_A(x, y)$ and $I_B(x, y)$, in the planes A and B respectively, are known and $I_A(x, y)$ and $I_B(x, y)$ are related by a single Fourier transform. With the given intensity cross-sections, an approximation to the phase distribution in the planes A and B, $\Psi_A(x, y)$ and $\Psi_B(x, y)$ respectively, is found. The Gerchberg-Saxton algorithm finds solutions to this problem by following an iterative process.

The Gerchberg-Saxton algorithm iteratively applies spatial and spectral constraints while repeatedly transferring a data set (amplitude and phase), representative of $I_A(x, y)$ and $I_B(x, y)$, between the spatial domain and the Fourier (spectral) domain. The spatial and spectral constraints are $I_A(x, y)$ and $I_B(x, y)$ respectively. The constraints in either the spatial or spectral domain are imposed upon the amplitude of the data set. The corresponding phase information is retrieved through a series of iterations.

In some embodiments, the hologram is calculated using an algorithm based on the Gerchberg-Saxton algorithm such as described in British patent 2,498,170 or 2,501,112 which are hereby incorporated in their entirety by reference.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

However, some embodiments relate to Fourier holography and Gerchberg-Saxton type algorithms by way of example only. The present disclosure is equally applicable to Fresnel holography and holograms calculated by other techniques such as those based on point cloud methods.

The present disclosure may be implemented using any one of a number of different types of SLM. The SLM may output spatially modulated light in reflection or transmission. In some embodiments, the SLM is a liquid crystal on silicon LCOS-SLM but the present disclosure is not restricted to this type of SLM.

FIG. 1 is a block diagram illustrating an example of a network environment suitable for an augmented reality user interface, according to some example embodiments.

A network environment 100 includes a display device 102 and a server 110, communicatively coupled to each other via a network 108. The display device 102 and the server 110 may each be implemented in a computer system, in whole or in part, as described below with respect to FIG. 12.

The server 110 may be part of a network-based system. For example, the network-based system may be or include a cloud-based server system that provides additional information, such as 3D models or other virtual objects, to the display device 102.

A user 106 may wear the display device 102 and look at a physical object 104 in a real world physical environment. The user 106 may be a human user (e.g., a human being), a machine user (e.g., a computer configured by a software program to interact with the display device 102), or any suitable combination thereof (e.g., a human assisted by a machine or a machine supervised by a human). The user 106 is not part of the network environment 100, but is associated with the display device 102. For example, the display device 102 may be a computing device with a camera and a transparent display such as a tablet, smartphone, or a wearable computing device (e.g., helmet or glasses). In another example embodiment, the computing device may be hand-held or may be removably mounted to the head of the user 106. In one example, the display may be a screen that displays what is captured with a camera of the display device 102. In another example, the display of the display device 102 may be transparent or semi-transparent such as in lenses of wearable computing glasses or the visor or a face shield of a helmet.

The user 106 may be a user of an AR application in the display device 102 and at the server 110. The AR application may provide the user 102 with an AR experience triggered by identified objects (e.g., physical object 104) in the physical environment. For example, the physical object 104 include identifiable objects such as a 2D physical object (e.g., a picture), a 3D physical object (e.g., a factory machine), a location (e.g., at the bottom floor of a factory), or any references (e.g., perceived corners of walls or furniture) in the real world physical environment. The AR application may include computer vision recognition to determine corners, objects, lines, letters, etc.

In one example embodiment, the objects in the image are tracked and recognized locally in the display device 102 using a local context recognition dataset or any other previously stored dataset of the AR application of the display device 102. The local context recognition dataset module may include a library of virtual objects associated with real-world physical objects or references. In one example, the display device 102 identifies feature points in an image of the physical object 104. The display device 102 may also identify tracking data related to the physical object 104 (e.g., GPS location of the display device 102, orientation, distance to the physical object 104). If the captured image is not recognized locally at the display device 102, the display device 102 can download additional information (e.g., 3D model or other augmented data) corresponding to the captured image, from a database of the server 110 over the network 108.

In another example embodiment, the physical object 104 in the image is tracked and recognized remotely at the server 110 using a remote context recognition dataset or any other previously stored dataset of an AR application in the server 110. The remote context recognition dataset module may include a library of virtual objects or augmented information associated with real-world physical objects or references.

External sensors 112 may be associated with, coupled to, related to the physical object 104 to measure a location, status, and characteristics of the physical object 104. Examples of measured readings may include and but are not limited to weight, pressure, temperature, velocity, direction, position, intrinsic and extrinsic properties, acceleration, and dimensions. For example, external sensors 112 may be disposed throughout a factory floor to measure movement, pressure, orientation, and temperature. The external sensors 112 can also be used to measure a location, status, and characteristics of the display device 102 and the user 106. The server 110 can compute readings from data generated by the external sensors 112. The server 110 can generate virtual indicators such as vectors or colors based on data from external sensors 112. Virtual indicators are then overlaid on top of a live image or a view of the physical object 104 in a line of sight of the user 106 to show data related to the object 116. For example, the virtual indicators may include arrows with shapes and colors that change based on real-time data. The visualization may be provided to the physical object 104 so that the display device 102 can render the virtual indicators in a display of the display device 102. In another example embodiment, the virtual indicators are rendered at the server 110 and streamed to the display device 102.

The external sensors 112 may include other sensors used to track the location, movement, and orientation of the display device 102 externally without having to rely on sensors internal to the display device 102. The sensors 112 may include optical sensors (e.g., depth-enabled 3D camera), wireless sensors (Bluetooth, Wi-Fi), GPS sensors, and audio sensors to determine the location of the user 106 wearing the display device 102, distance of the user 106 to the external sensors 112 (e.g., sensors placed in corners of a venue or a room), the orientation of the display device 102 to track what the user 106 is looking at (e.g., direction at which the display device 102 is pointed, e.g., display device 102 pointed towards a player on a tennis court, display device 102 pointed at a person in a room).

In another example embodiment, data from the external sensors 112 and internal sensors in the display device 102 may be used for analytics data processing at the server 110 (or another server) for analysis on usage and how the user 106 is interacting with the physical object 104 in the physical environment. Live data from other servers may also be used in the analytics data processing. For example, the analytics data may track at what locations (e.g., points or features) on the physical or virtual object the user 106 has looked, how long the user 106 has looked at each location on the physical or virtual object, how the user 106 wore the display device 102 when looking at the physical or virtual object, which features of the virtual object the user 106 interacted with (e.g., such as whether the user 106 engaged with the virtual object), and any suitable combination thereof. The display device 102 receives a visualization content dataset related to the analytics data. The display device 102 then generates a virtual object with additional or visualization features, or a new experience, based on the visualization content dataset.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIG. 12. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 108 may be any network that enables communication between or among machines (e.g., server 110), databases, and devices (e.g., device 101). Accordingly, the network 108 may be a wired network, a wireless network (e.g., a mobile or cellular network), or any suitable combination thereof. The network 108 may include one or more portions that constitute a private network, a public network (e.g., the Internet), or any suitable combination thereof.

Figure 2:
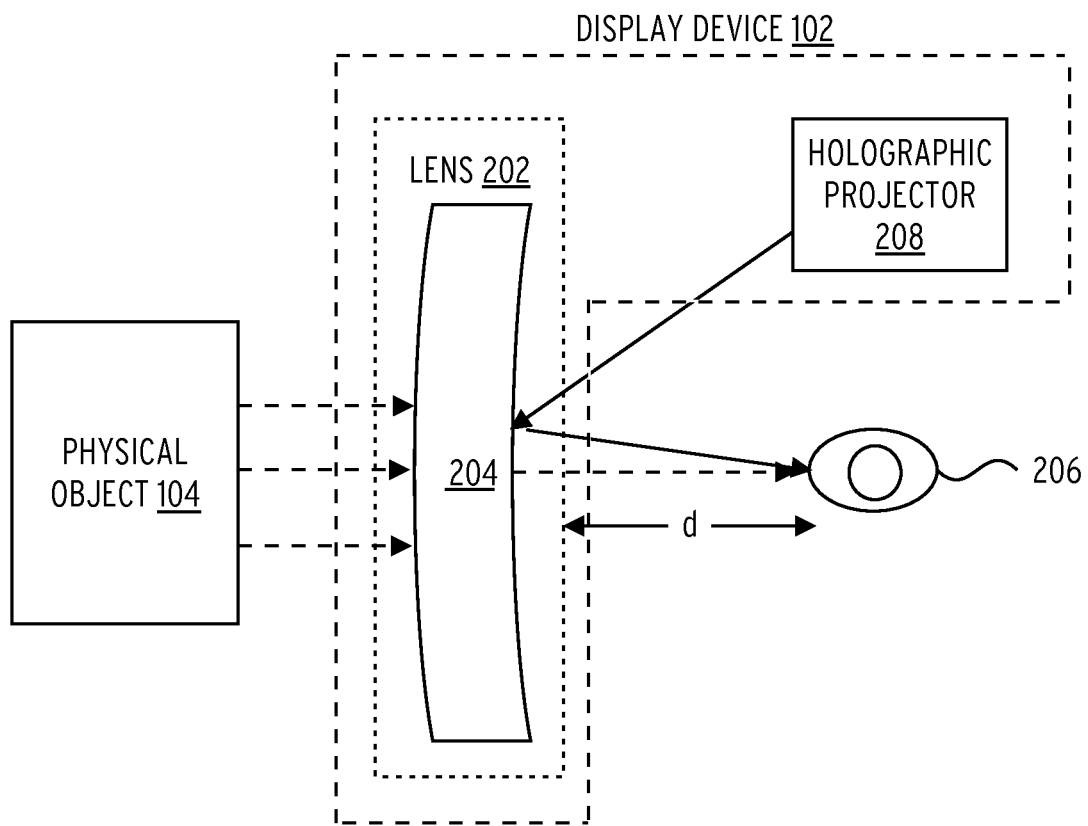
FIG. 2 is a block diagram illustrating a display device in accordance with one example embodiment.

FIG. 2 is a block diagram illustrating a display device 102 in accordance with one example embodiment.

The display device 102 includes a mobile computing device (e.g., a helmet, a visor, eyeglasses or any other device that may be mounted to a head of a user 106). The display device 102 includes a lens 202 and a holographic projector 208.

The lens 202 is disposed or positioned in front of the eye 206 of the user 106 within a predefined distance "d". The predefined distance may be from 1 cm to 5 cm and may be referred to as a "near-eye." The predefined distance "d" may be about the same as the typical distance between lenses of eyeglasses and the eyes of a wearer of the eyeglasses. In another example, the predefined distance "d" may include a distance between a visor of a helmet and the eyes of a wearer of the helmet.

The lens 202 includes, for example, a visor or transparent face shield positioned in front of the eyes of the user 106. In one example embodiment, the lens 202 includes a parabolic element 204. The parabolic element 204 includes a partially reflective parabolic reflector lens that includes a convex side and a concave side. A reflective coating material, such as silver, may be applied to the concave side of the parabolic element 204 to enable the lens 202 to partially reflect light from the holographic projector 208 towards the eye 206 of the user 106. In another example embodiment, the parabolic element 204 has a focus point positioned at or around the eye 206. The reflection index of the parabolic element 204 may be increased or decreased based on the amount of reflective coating material applied to the concave side of the parabolic element 204. The convex side of the parabolic element 204 is not reflective. Therefore, light reflected off the physical object 104 passes through the lens 202 to the eye 206 of the user 106.

The holographic projector 208 generates a modulated laser light directed at the parabolic element 204. The modulated laser light is reflected off the parabolic element 204 back to the eye 206 of the user 106. The modulated laser light forms a holographic image perceived by the eye 206 of the user 106 in the form of a reconstructed wavefront. In one example embodiment, the lens 202 combines light reflected from the holographic projector 208 with light reflected off the physical object 104 towards the eye 206 of the user 106. The user 106 may perceive the holographic image interacting with the physical object 104. For example, the perceived depth of the holographic image may correspond to the depth of the physical object 104 such that the user 106 perceives the holographic image to be engaged with the physical object 104.

Figure 3:
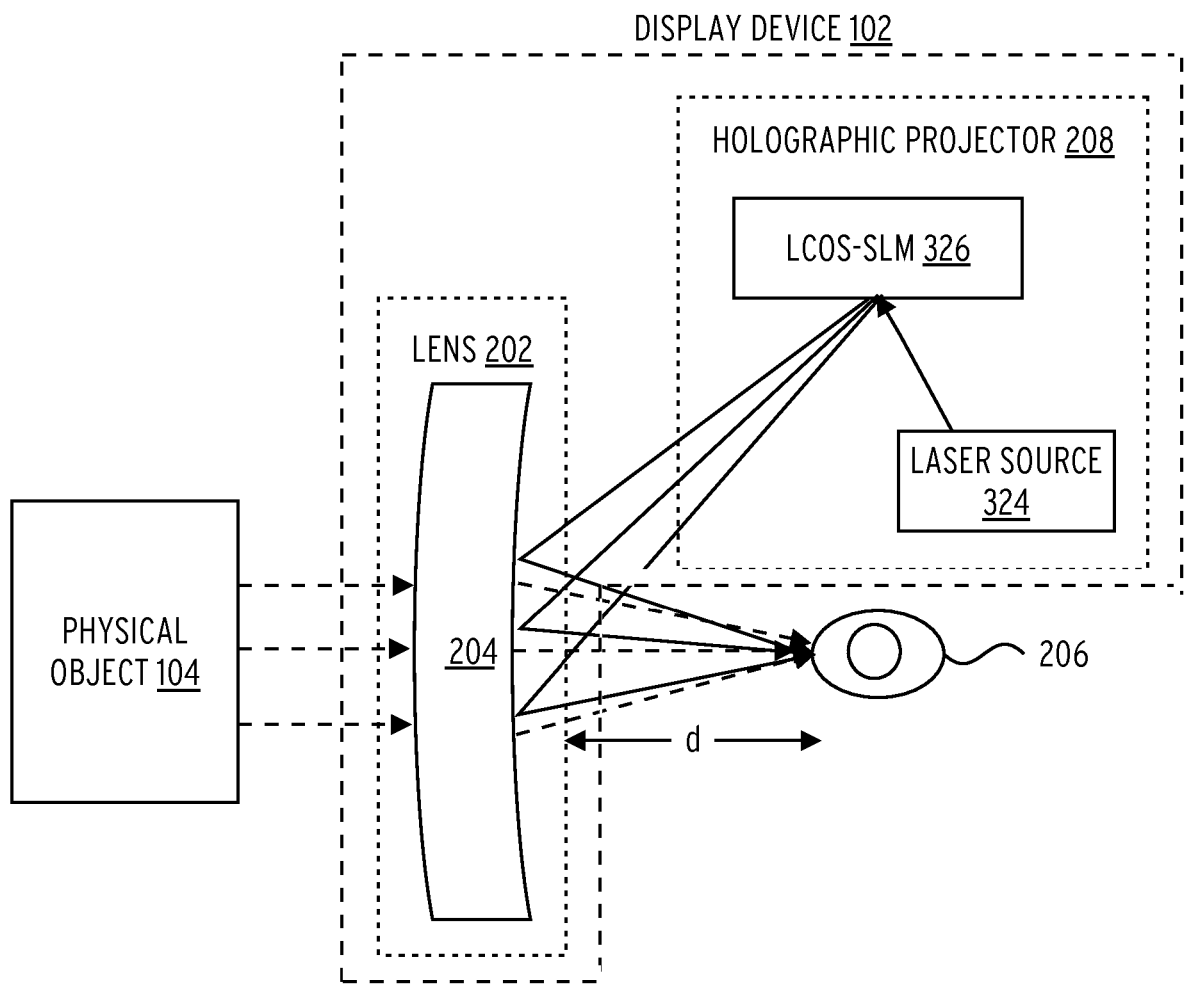
FIG. 3 is a block diagram illustrating a display device in accordance with another example embodiment.

FIG. 3 is a block diagram illustrating the display device 102 in accordance with another example embodiment.

The holographic projector 208 includes an LCOS-SLM 326 (Liquid Crystal on Silicon Spatial Light Modulator) and a laser source 324. The laser source 324 generates laser light. In some embodiments, the laser light corresponds to an image data or a content data. The laser source 324 directs the laser light towards the LCOS-SLM 326. In some embodiments, the LCOS-SLM 326 modulates the incident light (e.g., laser light from the laser source 324) based on depth encoded signal associated with the image data or content data. In other embodiments, the LCOS-SLM 326 modulates the incident light (e.g. laser light from the laser source 324) in accordance with a computer-generated hologram represented on the pixels of the LCOS-SLM 326. The modulated laser light from the LCOS-SLM 326 is directed at the parabolic element 204 to reflect back into the eye 206 of the user 106.

The modulated laser light forms a holographic image that can be perceived by the eye 206 of the user 106.

A holographic reconstruction can be formed from a "hologram" containing only phase (or only amplitude or a combination thereof) information related to the original object. Such holographic recordings may be referred to as phase-only holograms. Computer-generated holography may numerically simulate the interference process, using Fourier techniques for example, to produce a computer-generated phase-only hologram. In accordance with one example embodiment, a computer-generated phase-only hologram may be used to produce a holographic reconstruction representative of an object.

The term "hologram" therefore relates to the recording which contains information about the object and which can be used to form a reconstruction representative of the object. The hologram may contain information about the object in the frequency, or Fourier, domain.

Returning back to the lens 202, the lens 202 combines the modulated laser light reflected from the LCOS-SLM 326 with visible light reflected off the physical object 104 towards the eye 206 of the user 106. The user 106 may perceive the holographic image interacting with the physical object 104. For example, the perceived depth of the holographic image may correspond to the depth of the physical object 104 such that the user 106 perceives the holographic image to be engaged with the physical object 104 at the same depth.

Figure 4:
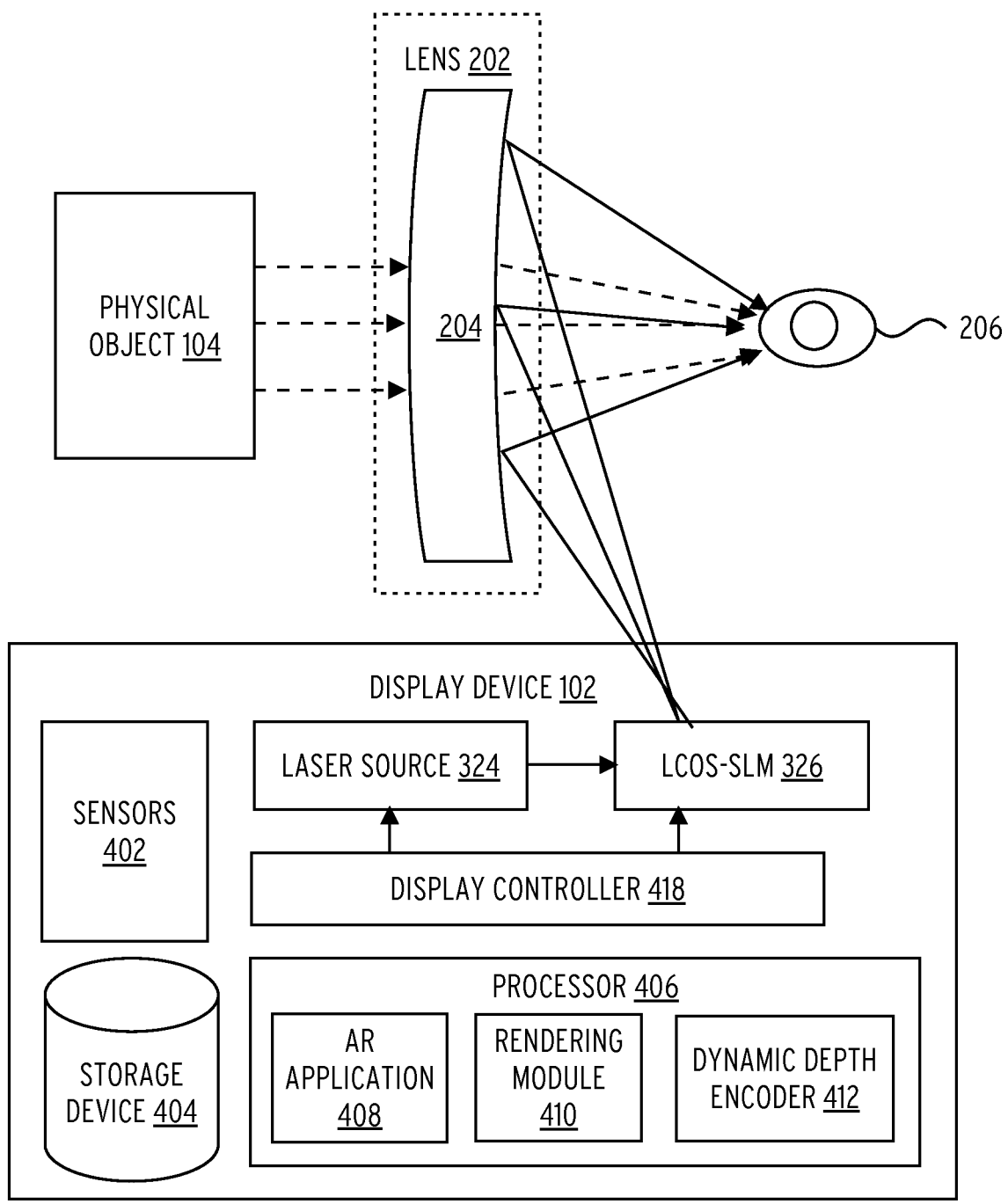
FIG. 4 is a block diagram illustrating an example embodiment of modules (e.g., components) of a display device.

FIG. 4 is a block diagram illustrating an example embodiment of modules (e.g., components) of the display device 102. The display device 102 includes the laser source 324, the LCOS-SLM 326, sensors 402, a display controller 418, a processor 406, and a storage device 404.

The laser source 324 generates a laser light. In some embodiments, the laser light corresponds to an image data or a content data provided by the processor 406. The laser source 324 directs the laser light towards the LCOS-SLM 326. In some embodiments, the LCOS-SLM 326 modulates the incident light (e.g., laser light from the laser source 324) based on depth encoded signal associated with the image data or content data. In other embodiments, the LCOS-SLM 326 modulates the incident light (e.g. laser light from the laser source 324) in accordance with a computer-generated hologram represented on the pixels of the LCOS-SLM 326. The modulated laser light from the LCOS-SLM 326 is directed at the parabolic element 204 to reflect back into the eye 206 of the user 106.

The sensors 402 include, for example, a thermometer, an infrared camera, a barometer, a humidity sensor, an EEG sensor, a proximity or location sensor (e.g, near field communication, GPS, Bluetooth, Wifi), an optical sensor (e.g., camera), an orientation sensor (e.g., gyroscope), an audio sensor (e.g., a microphone), or any suitable combination thereof. For example, the sensors 402 may include a rear facing camera and a front facing camera in display device 102. It is noted that the sensors described herein are for illustration purposes and the sensors 402 are thus not limited to the ones described.

The processor 406 includes an AR application 408 (or a mixed reality or virtual reality application), a rendering module 410, and a dynamic depth encoder 412. The AR application 408 receives data from sensors 402 (e.g., receive an image of the physical object 104) and identifies and recognizes the physical object 104 using machine-vision recognition techniques. The AR application 408 then retrieves from the storage device 404 AR content associated with the physical object 104. In one example embodiment, the AR application 408 identifies a visual reference (e.g., a logo or QR code) on the physical object (e.g., a chair) and tracks the location of the visual reference within a field of view of a camera of the display device 102. The visual reference may also be referred to as a marker and may consist of an identifiable image, symbol, letter, number, machine-readable code. For example, the visual reference may include a bar code, a quick response (QR) code, or an image that has been previously associated with the virtual object.

The rendering module 410 renders virtual objects based on data from sensors 402. For example, the rendering module 410 renders a display of a virtual object (e.g., a door with a color based on the temperature inside the room as detected by external sensors 112) based on a three-dimensional model of the virtual object (e.g., 3D model of a virtual door) associated with the physical object 104 (e.g., a physical door). In another example, the rendering module 410 generates a display of the virtual object overlaid on an image of the physical object 104 captured by a camera of the display device 102. The virtual object may be further manipulated (e.g., by the user 106) by moving the physical object 104 relative to the display device 102. Similarly, the display of the virtual object may be manipulated (e.g., by the user 106) by moving the display device 102 relative to the physical object 104.

In another example embodiment, the rendering module 410 includes a local rendering engine that generates a visualization of a three-dimensional virtual object overlaid (e.g., superimposed upon, or otherwise displayed in tandem with) on an image of the physical object 104 captured by a camera of the display device 102 or a view of the physical object in the display controller 418 of the display device 102.

In one example embodiment, the rendering module 410 identifies the physical object 104 (e.g., a physical telephone) based on data from sensors 402 and external sensors 112, accesses virtual functions (e.g., increase or lower the volume of a nearby television) associated with physical manipulations (e.g., lifting a physical telephone handset) of the physical object 104, and generates a virtual function corresponding to a physical manipulation of the physical object 104.

In another example embodiment, the rendering module 410 determines whether the captured image matches an image locally stored in the storage device 404 that includes a local database of images and corresponding additional information (e.g., three-dimensional model and interactive features). The rendering module 410 retrieves a primary content dataset from the server 110, generates and updates a contextual content dataset based on an image captured with the display device 102.

The dynamic depth encoder 412 determines depth information of the virtual content based on the depth of the content or portion of the content relative to the lens 202. In another example embodiment, depth information may be based on the detected depth of the physical object 104. The dynamic depth encoder 412 may encode the depth information with the AR content provided by the AR application 408. Alternatively, the depth information is provided separately from the AR content to the display controller 418.

The storage device 404 stores an identification of the sensors and their respective functions. The storage device 404 further includes a database of visual references (e.g., images, visual identifiers, features of images) and corresponding experiences (e.g., three-dimensional virtual objects, interactive features of the three-dimensional virtual objects). For example, the visual reference may include a machine-readable code or a previously identified image (e.g., a picture of shoe). The previously identified image of the shoe may correspond to a three-dimensional virtual model of the shoe that can be viewed from different angles by manipulating the position of the display device 102 relative to the picture of the shoe. Features of the three-dimensional virtual shoe may include selectable icons on the three-dimensional virtual model of the shoe. An icon may be selected or activated using a user interface on the display device 102.

In another example embodiment, the storage device 404 includes a primary content dataset, a contextual content dataset, and a visualization content dataset. The primary content dataset includes, for example, a first set of images and corresponding experiences (e.g., interaction with three-dimensional virtual object models). For example, an image may be associated with one or more virtual object models. The primary content dataset may include a core set of images of the most popular images determined by the server 110. The core set of images may include a limited number of images identified by the server 110. For example, the core set of images may include the images depicting covers of the ten most popular landmark and their corresponding experiences (e.g., virtual objects that represent the ten most popular landmark—a virtual King Kong for the Empire State building in New York). In another example, the server 110 generates the first set of images based on the most popular or often scanned images received at the server 110. Thus, the primary content dataset does not depend on objects or images scanned by the rendering module 214 of the display device 102.

The contextual content dataset includes, for example, a second set of images and corresponding experiences (e.g., three-dimensional virtual object models) retrieved from the server 110. For example, images captured with the display device 102 that are not recognized (e.g., by the server 110) in the primary content dataset are submitted to the server 110 for recognition. If the captured image is recognized by the server 110, a corresponding experience may be downloaded at the display device 102 and stored in the contextual content dataset. Thus, the contextual content dataset relies on the context in which the display device 102 has been used. As such, the contextual content dataset depends on objects or images scanned by the rendering module 410 of the display device 102.

In one embodiment, the display device 102 may communicate over the network 108 with the server 110 to retrieve a portion of a database of visual references, corresponding three-dimensional virtual objects, and corresponding interactive features of the three-dimensional virtual objects. The network 108 may be any network that enables communication between or among machines, databases, and devices (e.g., the display device 102). Accordingly, the network 108 may be a wired network, a wireless network (e.g., a mobile or cellular network), or any suitable combination thereof. The network 108 may include one or more portions that constitute a private network, a public network (e.g., the Internet), or any suitable combination thereof.

Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 5:
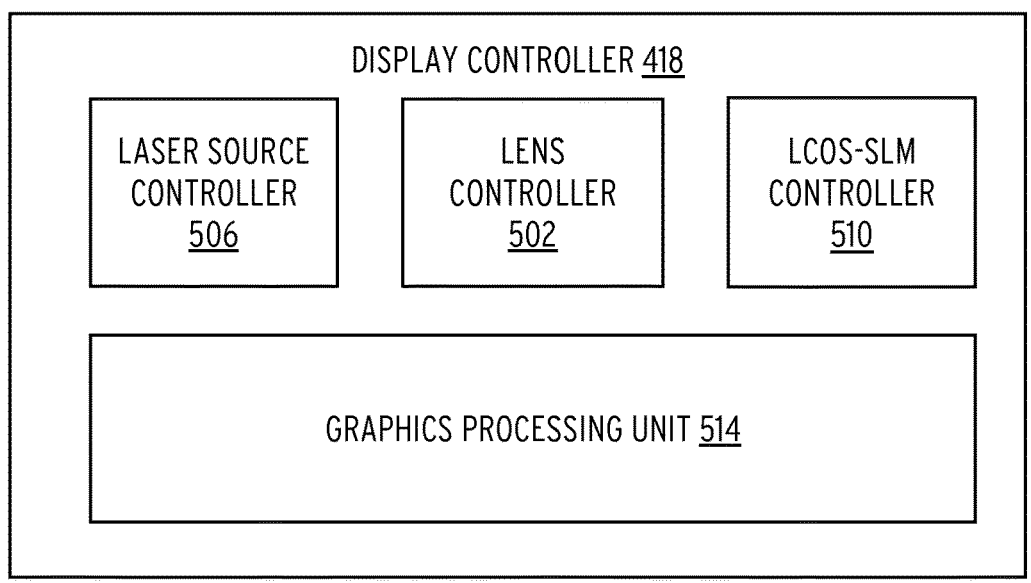
FIG. 5 is a block diagram illustrating a display controller in accordance with one example embodiment.

FIG. 5 is a block diagram illustrating a display controller in accordance with one example embodiment. The display controller 418 includes a laser source controller 506, a lens controller 502, an LCOS-SLM controller 510, and a Graphics Processing Unit 514. The display controller 418 may be implemented as a video and depth encoded signal generator having various components for generating data and control signals communicated to the laser source 324 and the LCOS-SLM 326.

In some embodiments, the Graphics Processing Unit 514 renders an image for display based on content data (e.g., corresponding to the image) received from the AR application 408 or rendering module 410. The Graphics Processing Unit 514 also receives depth encoded data corresponding to the content data. The Graphics Processing Unit 514 generates a first control signal based on the content data to the laser source controller 506. The Graphics Processing Unit 514 generates a second control signal based on the depth encoded data to the LCOS-SLM controller 510. The Graphics Processing Unit 514 generates a third control signal based on an identification of an operation mode to the lens controller 502. For example, the identification of the operation mode includes a virtual reality operation mode, a mixed reality operation mode, or an augmented reality operation mode.

In some embodiments, the laser source controller 506 generates and communicates a laser control signal based on the first control signal to direct the laser source 324 to generate the image produced by the Graphics Processing Unit 514. The LCOS-SLM controller 510 generates and communicates a depth control signal based on the second control signal to direct the LCOS-SLM 326 to modulate the laser light from the laser source 324 based on the depth encoded data produced by the Graphics Processing Unit 514.

In other embodiments, the Graphics Processing Unit 514 renders a computer-generated hologram for display based on content data (e.g., corresponding to the image), received from the AR application 408 or rendering module 410, and depth data for the content data. The Graphics Processing Unit 514 generates a first control signal for the laser source controller 506. The Graphics Processing Unit 514 generates a second control signal, corresponding to the computer-generated hologram, for the LCOS-SLM controller 510. The Graphics Processing Unit 514 generates a third control signal based on an identification of an operation mode to the lens controller 502. For example, the identification of the operation mode includes a virtual reality operation mode, a mixed reality operation mode, or an augmented reality operation mode.

In these other embodiments, the laser source controller 506 generates and communicates a laser control signal based on the first control signal to direct the laser source 324 to generate laser light having a plane wave. The LCOS-SLM controller 510 generates and communicates a signal based on the second control signal to direct the LCOS-SLM 326 to modulate the laser light from the laser source 324 in accordance with the computer-generated hologram produced by, or provided by, the Graphics Processing Unit 514. That is, the signal based on the second control signal instructs the LCOS-SLM 326 to represent, or display, the computer-generated hologram on the pixels of the LCOS-SLM 326.

The lens controller 502 generates and communicates a lens control signal based on the third control signal to direct the lens 202 to darken or lighten based on the type of operation mode. For example, in a virtual reality operation mode, the outside facing surface of the lens 202 becomes dark or opaque. In another example, in an augmented reality operation mode, the outside facing surface of the lens 202 becomes transparent.

Figure 6:
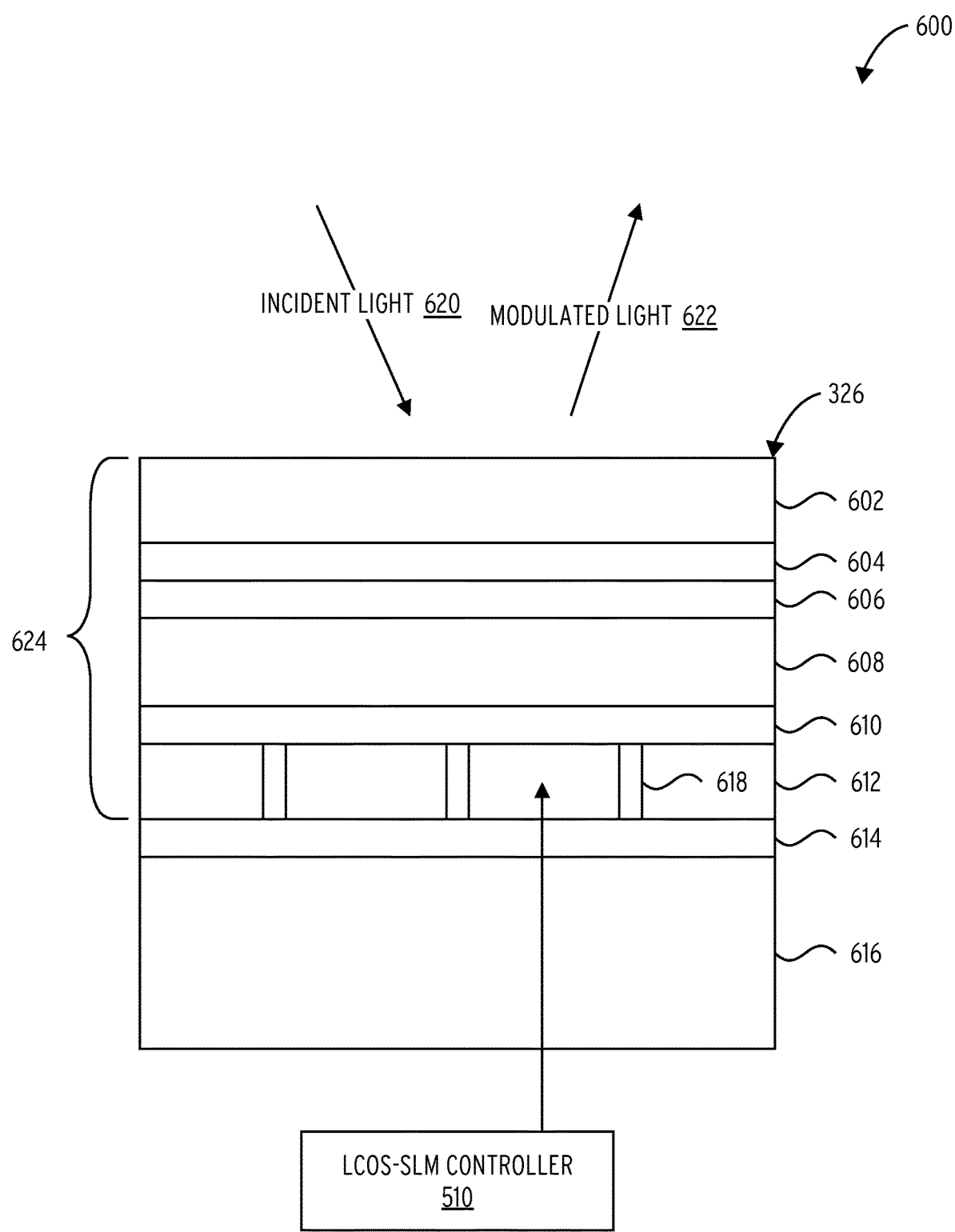
FIG. 6 is a diagram illustrating a cross-section of an example of a LCOS-SLM (Liquid Crystal on Silicon Spatial Light Modulator).

FIG. 6 is a diagram illustrating a cross-section of an example of a LCOS-SLM (Liquid Crystal on Silicon Spatial Light Modulator).

An LCOS-SLM 326 is formed using a single crystal silicon substrate 616. The substrate 616 consists of a two-dimensional array of square planar aluminium electrodes 612, spaced apart by a gap 618, arranged on the upper surface of the substrate 616. The electrodes 612 are connected to the substrate 616 via a circuit 614 buried in the substrate 616. Each electrode 612 forms a respective planar mirror. The electrodes 612 may be connected to the LCOS-SLM controller 510. In other words, the electrodes 612 receives control signal from the LCOS-SLM controller 510.

An alignment layer 610 is disposed on top of the two-dimensional array of electrodes 612, and a liquid crystal layer 608 is disposed on the alignment layer 610.

A second alignment layer 606 is disposed on top of the liquid crystal layer 608. A planar transparent layer 602 (e.g. made of glass) is disposed on the top of the second alignment layer 606. A single transparent electrode 604 is disposed between the planar transparent layer 602 and the second alignment layer 606.

Each of the square electrodes 612 defines, together with the overlying region of the transparent electrode 604 and the intervening liquid crystal layer 608, a controllable phase-modulating element 624 (also referred to as a pixel). The effective pixel area, or fill factor, is the percentage of the total pixel which is optically active, taking into account the space or gap 618 between pixels. By controlling the voltage applied to each electrode 612 with respect to the transparent electrode 604, the properties of the liquid crystal material (in the liquid crystal layer 608) of the respective phase modulating element may be varied. The variation of the phase modulating element provides a variable delay to incident light 620. The effect is to provide phase-only modulation to the wavefront (i.e. no amplitude effect occurs in the resulting modulated light 622).

One advantage of using a reflective LCOS spatial light modulator is that the liquid crystal layer can be half the thickness than would be necessary if a transmissive device were used. This greatly improves the switching speed of the liquid crystal (a key point for projection of moving video images). Another advantage is that a LCOS device is also capable of displaying large arrays of phase only elements in a small aperture. Small elements (typically approximately 10 microns or smaller) result in a practical diffraction angle (a few degrees) so that the optical system does not require a very long optical path.

It is easier to adequately illuminate the small aperture (a few square centimetres) of the LCOS-SLM 326 than it would be for the aperture of a larger liquid crystal device. LCOS SLMs also have a large aperture ratio, there being very little dead space between the pixels (because the circuitry to drive them is buried under the mirrors). The small aperture results in lowering the optical noise in the replay field.

Another advantage of using a silicon backplane (e.g., silicon substrate 616) has the advantage that the pixels are optically flat, which is important for a phase modulating device.

While embodiments relate to a reflective LCOS SLM, those of ordinary skilled in the art will recognize that other types of SLMs can be used including transmissive SLMs.

Figure 7:
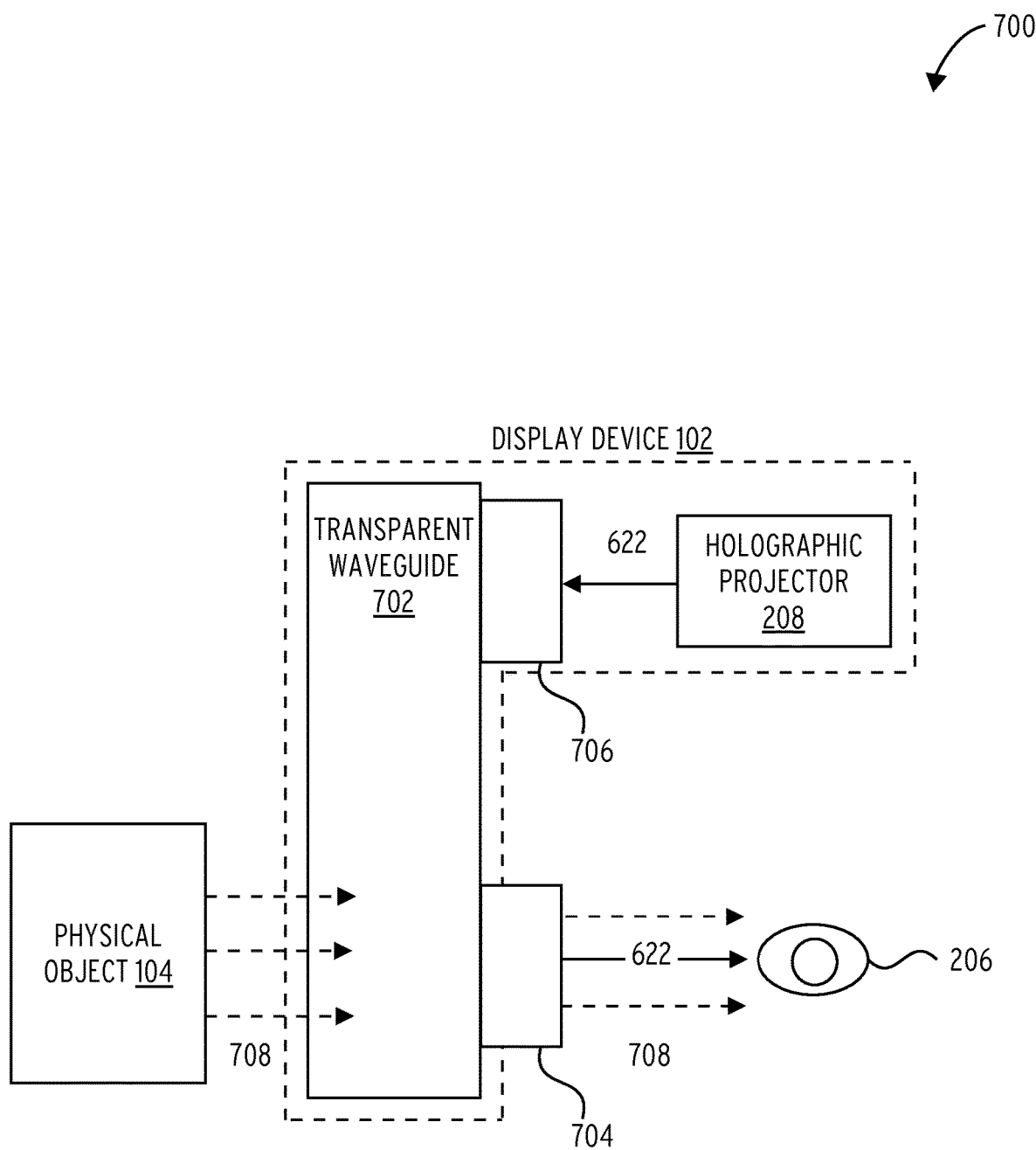
FIG. 7 is a block diagram illustrating a display device in accordance with another example embodiment.

FIG. 7 is a block diagram illustrating a display device in accordance with another example embodiment. The display device 102 includes a transparent waveguide 702, a first optical coupler 704, a second optical coupler 706, and a holographic projector 208.

The transparent waveguide 702 includes a transparent optical planar physical structure that guides visible and non-visible light. The first and second optical couplers 704, 706 are attached to a same side of the transparent waveguide 702 and are configured to receive and transmit (visible and non-visible) light to and from the transparent waveguide 308 via the first optical coupler 704 and second optical coupler 706. For example, the first and second optical couplers 704, 706 are connected to the side of the transparent waveguide 702 facing the eye 206. The first optical coupler 704 is adjacent and positioned in front of the eye 206. A line of sight is formed from the eye 206 through the first optical coupler 704 and the transparent waveguide 702 towards the physical object 104. The second optical coupler 706 is connected to an end of the transparent waveguide 702 adjacent to the holographic projector 208.

The holographic projector 208 generates modulated light 622 to the second optical coupler 706. The modulated light 622 from the holographic projector 208 travels through the transparent waveguide 702 until it exists through the first optical coupler 704. The modulated light 622 exiting the first optical coupler 704 shines into the eye 206 of the user 106 and forms a holographic image at the eye 206. The transparent waveguide 702 combines the modulated light 622 with the visible reflected light 708 from the physical object 104 at the eye 206. The holographic image is perceived as having a depth engaged with the perceived depth of the physical object 104. For example, the holographic image can be manipulated such that it appears at the same depth at the physical object 104 (or at a different depth of the physical object 104).

Figure 8:
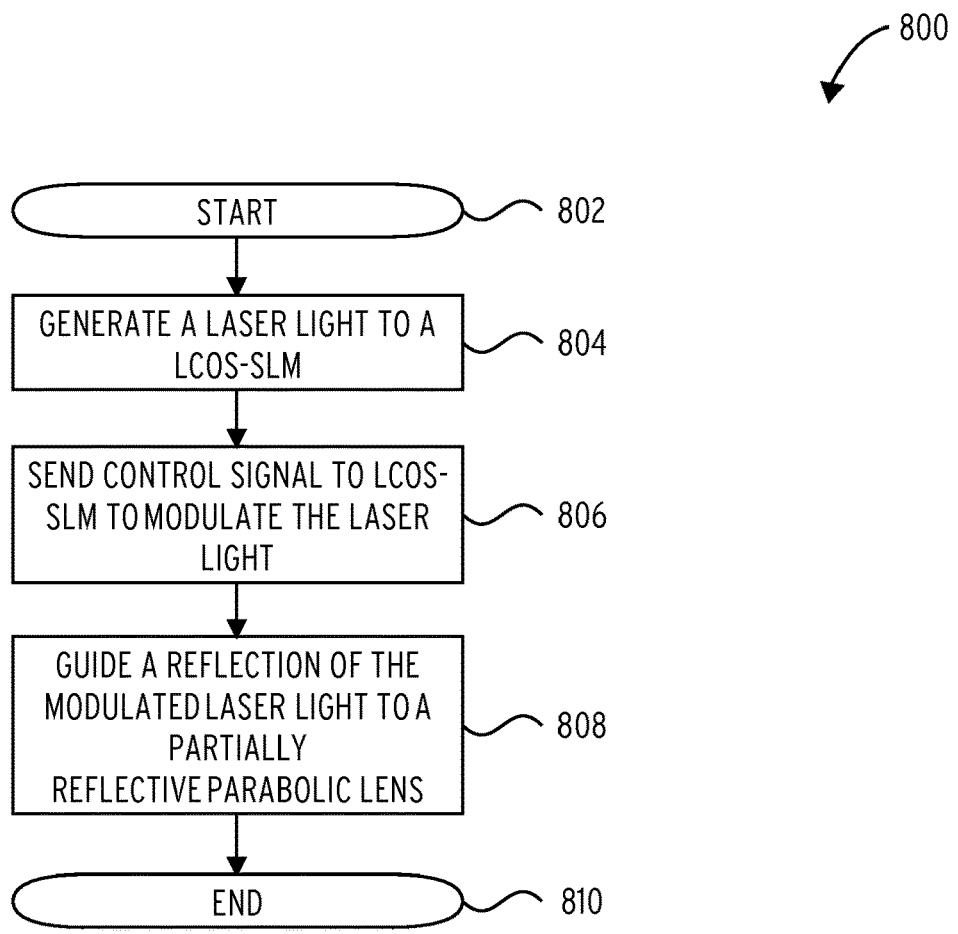
FIG. 8 is a flow diagram illustrating an example operation of a display device, in accordance with an example embodiment.

FIG. 8 is a flow diagram illustrating an example operation of a display device, in accordance with an example embodiment. At block 804, the laser source 324 generates a laser light directed to the LCOS-SLM 326. At block 806, the LCOS-SLM controller 510 sends a control signal to modulate the laser light based on encoded depth data related to augmented, virtual, or mixed reality data or, at block 806, the LCOS-SLM controller 510 sends a control signal to modulate the laser light based a computer-generated hologram related to augmented, virtual, or mixed reality data. At block 808, the modulated laser light is directed to a partially reflective parabolic lens (e.g., parabolic element 204).

Figure 9:
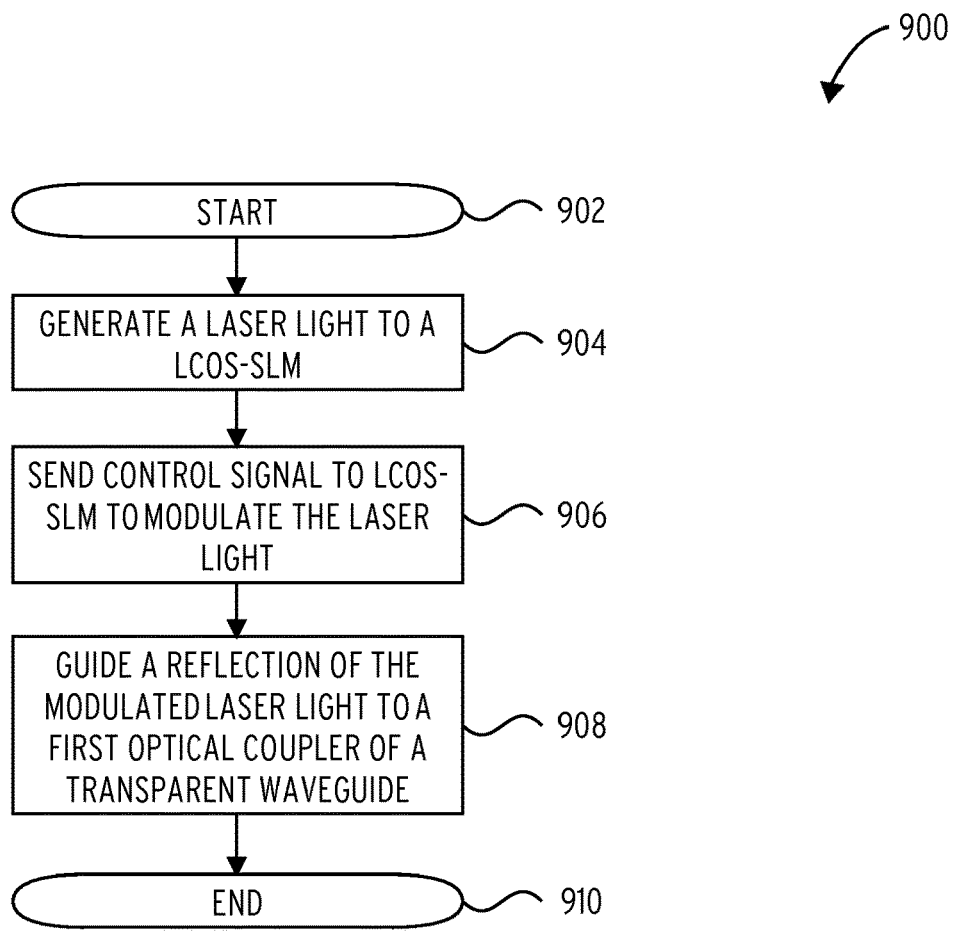
FIG. 9 is a flow diagram illustrating another example operation of a display device, in accordance with an example embodiment.

FIG. 9 is a flow diagram illustrating another example operation of a display device, in accordance with an example embodiment. At block 904, the laser source 324 generates a laser light directed to the LCOS-SLM 326. At block 906, the LCOS-SLM controller 510 sends a control signal to modulate the laser light based on encoded depth data related to augmented, virtual, or mixed reality data or, at block 906, the LCOS-SLM controller 510 sends a control signal to modulate the laser light based a computer-generated hologram related to augmented, virtual, or mixed reality data. At block 908, the modulated laser light is directed to the second optical coupler 706 of the transparent waveguide 702.

Figure 10:
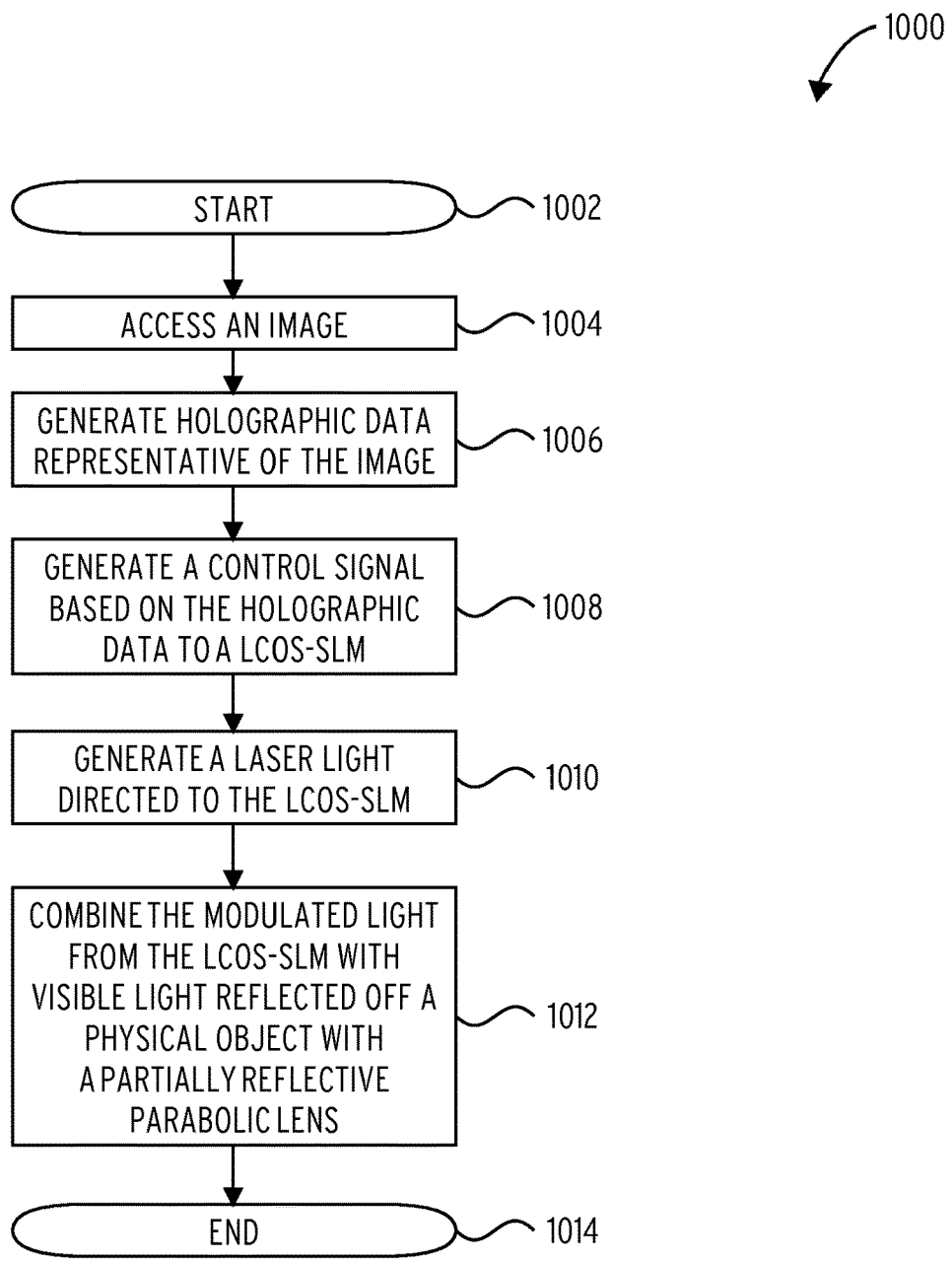
FIG. 10 is a flow diagram illustrating another example operation of a display device, in accordance with an example embodiment.

FIG. 10 is a flow diagram illustrating another example operation of a display device, in accordance with an example embodiment. At block 1004, the AR application 408 generates or accesses content data including an image and depth encoded data related to the image. At block 1006, the AR application 408 generates holographic data representative of the image. At block 1008, the dynamic depth encoder 412 generates a control signal based on the holographic data to the LCOS-SLM controller 510. At block 1010, the laser source 324 generates a laser light directed to the LCOS-SLM 326. A partially transparent parabolic element combines the modulated laser light from the LCOS-SLM 326 with visible light reflected off the physical object 104.

Figure 11:
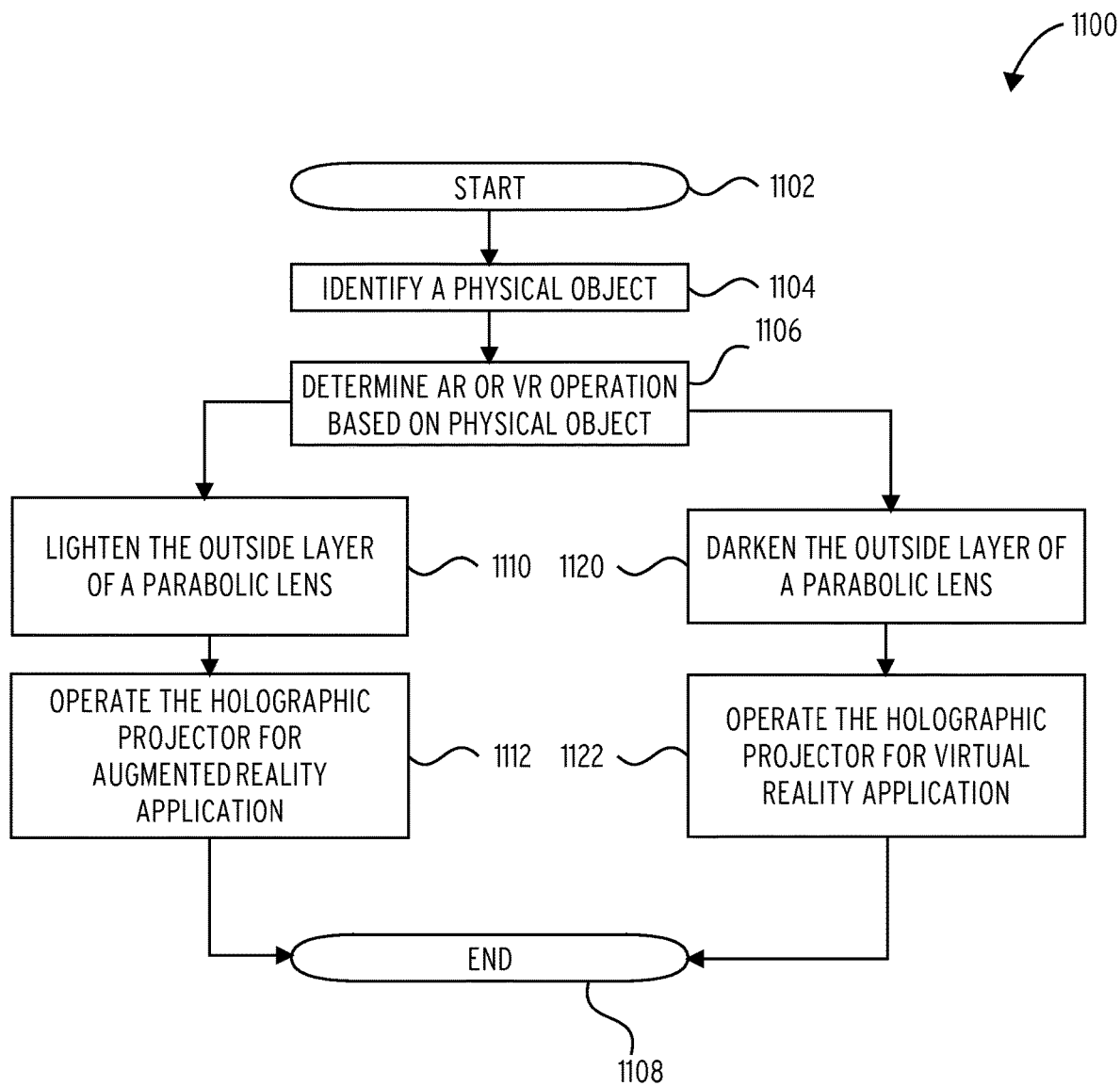
FIG. 11 is a flow diagram illustrating another example operation of a display device, in accordance with an example embodiment.

FIG. 11 is a flow diagram illustrating another example operation of a display device, in accordance with an example embodiment. At block 1104, the AR application 408 identifies the physical object 104. At block 1106, the AR application 408 determines whether to activate an AR or mixed reality operation mode or a VR operation mode based on the identity of the physical object 104. In another example embodiment, the operation mode may be manually activated by the user 106 of the display device 102.

At block 1110, in an AR or mixed reality operation mode, the AR application 408 controls the lens 202 to lighten (or make partially transparent) an outside layer of the parabolic element 204. At block 1112, the AR application 408 operates the holographic projector 208 for an augmented reality application.

At block 1120, in a VR operation mode, the AR application 408 controls the lens 202 to darken (or render opaque) an outside layer of the parabolic element 204. At block 1112, the AR application 408 operates the holographic projector 208 for a virtual reality application.

Figure 12:
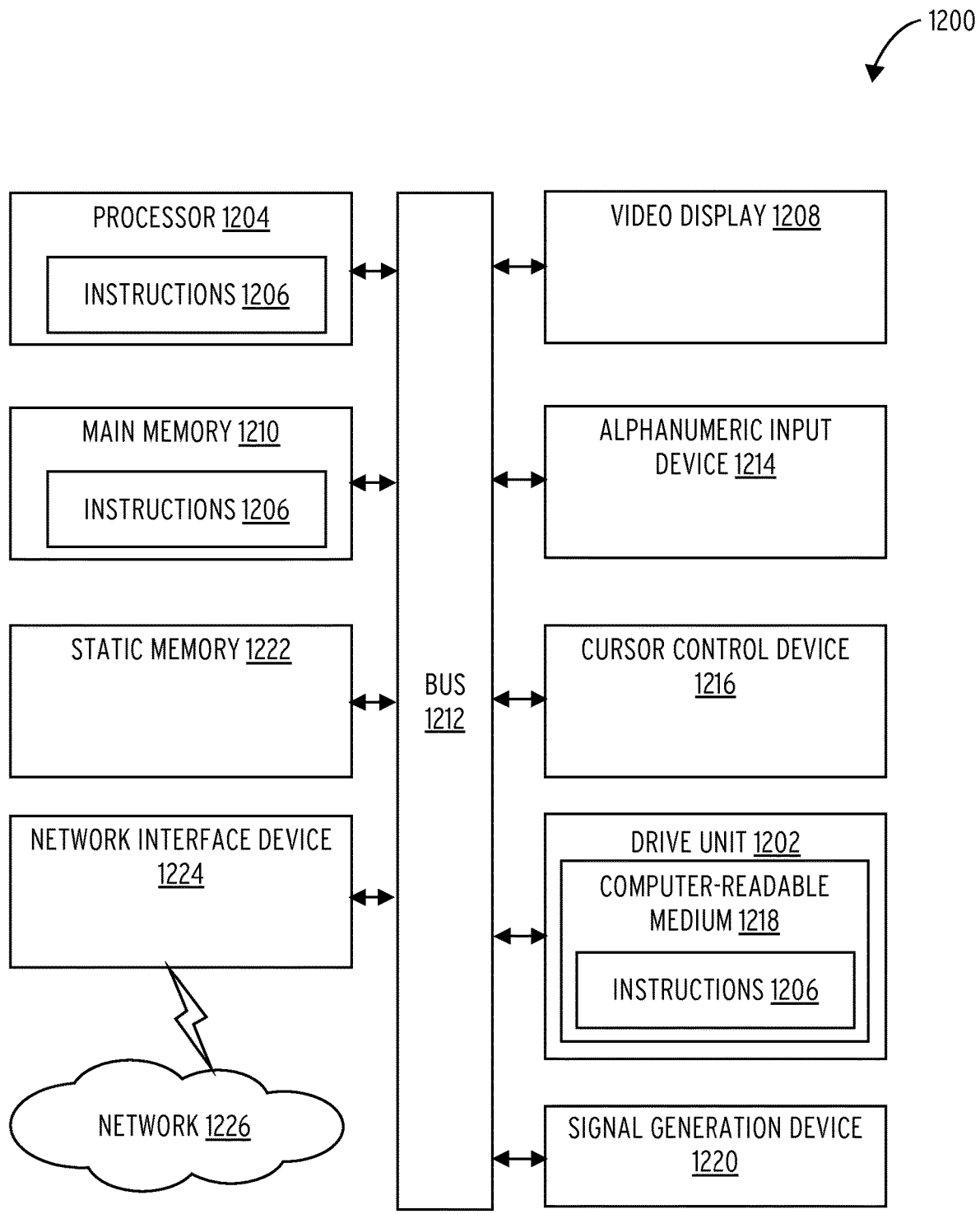
FIG. 12 a block diagram illustrating components of a machine, according to some example embodiments, able to read instructions from a machine-readable medium and perform any one or more of the methodologies discussed herein.

FIG. 12 is a block diagram illustrating components of a machine 1200, according to some example embodiments, able to read instructions 1206 from a computer-readable medium 1218 (e.g., a non-transitory machine-readable medium, a machine-readable storage medium, a computer-readable storage medium, or any suitable combination thereof) and perform any one or more of the methodologies discussed herein, in whole or in part. Specifically, the machine 1200 in the example form of a computer system (e.g., a computer) within which the instructions 1206 (e.g., software, a program, an application, an applet, an app, or other executable code) for causing the machine 1200 to perform any one or more of the methodologies discussed herein may be executed, in whole or in part.

In alternative embodiments, the machine 1200 operates as a standalone device or may be communicatively coupled (e.g., networked) to other machines. In a networked deployment, the machine 1200 may operate in the capacity of a server machine or a client machine in a server-client network environment, or as a peer machine in a distributed (e.g., peer-to-peer) network environment. The machine 1200 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 1206, sequentially or otherwise, that specify actions to be taken by that machine. Further, while only a single machine is illustrated, the term "machine" shall also be taken to include any collection of machines that individually or jointly execute the instructions 1206 to perform all or part of any one or more of the methodologies discussed herein.

The machine 1200 includes a processor 1204 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1210, and a static memory 1222, which are configured to communicate with each other via a bus 1212. The processor 1204 contains solid-state digital microcircuits (e.g., electronic, optical, or both) that are configurable, temporarily or permanently, by some or all of the instructions 1206 such that the processor 1204 is configurable to perform any one or more of the methodologies described herein, in whole or in part. For example, a set of one or more microcircuits of the processor 1204 may be configurable to execute one or more modules (e.g., software modules) described herein. In some example embodiments, the processor 1204 is a multicore CPU (e.g., a dual-core CPU, a quad-core CPU, or a 128-core CPU) within which each of multiple cores behaves as a separate processor that is able to perform any one or more of the methodologies discussed herein, in whole or in part. Although the beneficial effects described herein may be provided by the machine 1200 with at least the processor 1204, these same beneficial effects may be provided by a different kind of machine that contains no processors (e.g., a purely mechanical system, a purely hydraulic system, or a hybrid mechanical-hydraulic system), if such a processor-less machine is configured to perform one or more of the methodologies described herein.

The machine 1200 may further include a video display 1208 (e.g., a plasma display panel (PDP), a light emitting diode (LED) display, a liquid crystal display (LCD), a projector, a cathode ray tube (CRT), or any other display capable of displaying graphics or video). The machine 1200 may also include an alphanumeric input device 1214 (e.g., a keyboard or keypad), a cursor control device 1216 (e.g., a mouse, a touchpad, a trackball, a joystick, a motion sensor, an eye tracking device, or other pointing instrument), a drive unit 1202, a signal generation device 1220 (e.g., a sound card, an amplifier, a speaker, a headphone jack, or any suitable combination thereof), and a network interface device 1224.

The drive unit 1202 (e.g., a data storage device) includes the computer-readable medium 1218 (e.g., a tangible and non-transitory machine-readable storage medium) on which are stored the instructions 1206 embodying any one or more of the methodologies or functions described herein. The instructions 1206 may also reside, completely or at least partially, within the main memory 1210, within the processor 1204 (e.g., within the processor's cache memory), or both, before or during execution thereof by the machine 1200. Accordingly, the main memory 1210 and the processor 1204 may be considered machine-readable media (e.g., tangible and non-transitory machine-readable media). The instructions 1206 may be transmitted or received over a computer network via the network interface device 1224. For example, the network interface device 1224 may communicate the instructions 1206 using any one or more transfer protocols (e.g., hypertext transfer protocol (HTTP)).

In some example embodiments, the machine 1200 may be a portable computing device (e.g., a smart phone, tablet computer, or a wearable device), and have one or more additional input components (e.g., sensors or gauges). Examples of such input components include an image input component (e.g., one or more cameras), an audio input component (e.g., one or more microphones), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), a biometric input component (e.g., a heartrate detector or a blood pressure detector), and a gas detection component (e.g., a gas sensor). Input data gathered by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the computer-readable medium 1218 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 1206 for execution by the machine 1200, such that the instructions 1206, when executed by one or more processors of the machine 1200 (e.g., processor 1204), cause the machine 1200 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible and non-transitory data repositories (e.g., data volumes) in the example form of a solid-state memory chip, an optical disc, a magnetic disc, or any suitable combination thereof. A "non-transitory" machine-readable medium, as used herein, specifically does not include propagating signals per se. In some example embodiments, the instructions 1206 for execution by the machine 1200 may be communicated by a carrier medium. Examples of such a carrier medium include a storage medium (e.g., a non-transitory machine-readable storage medium, such as a solid-state memory, being physically moved from one place to another place) and a transient medium (e.g., a propagating signal that communicates the instructions 1206).

Certain example embodiments are described herein as including modules. Modules may constitute software modules (e.g., code stored or otherwise embodied in a machine-readable medium or in a transmission medium), hardware modules, or any suitable combination thereof. A "hardware module" is a tangible (e.g., non-transitory) physical component (e.g., a set of one or more processors) capable of performing certain operations and may be configured or arranged in a certain physical manner. In various example embodiments, one or more computer systems or one or more hardware modules thereof may be configured by software (e.g., an application or portion thereof) as a hardware module that operates to perform operations described herein for that module.

In some example embodiments, a hardware module may be implemented mechanically, electronically, hydraulically, or any suitable combination thereof. For example, a hardware module may include dedicated circuitry or logic that is permanently configured to perform certain operations. A hardware module may be or include a special-purpose processor, such as a field programmable gate array (FPGA) or an ASIC. A hardware module may also include programmable logic or circuitry that is temporarily configured by software to perform certain operations. As an example, a hardware module may include software encompassed within a CPU or other programmable processor. It will be appreciated that the decision to implement a hardware module mechanically, hydraulically, in dedicated and permanently configured circuitry, or in temporarily configured circuitry (e.g., configured by software) may be driven by cost and time considerations.

Accordingly, the phrase "hardware module" should be understood to encompass a tangible entity that may be physically constructed, permanently configured (e.g., hardwired), or temporarily configured (e.g., programmed) to operate in a certain manner or to perform certain operations described herein. Furthermore, as used herein, the phrase "hardware-implemented module" refers to a hardware module. Considering example embodiments in which hardware modules are temporarily configured (e.g., programmed), each of the hardware modules need not be configured or instantiated at any one instance in time. For example, where a hardware module includes a CPU configured by software to become a special-purpose processor, the CPU may be configured as respectively different special-purpose processors (e.g., each included in a different hardware module) at different times. Software (e.g., a software module) may accordingly configure one or more processors, for example, to become or otherwise constitute a particular hardware module at one instance of time and to become or otherwise constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over suitable circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory (e.g., a memory device) to which it is communicatively coupled. A further hardware module may then, at a later time, access the memory to retrieve and process the stored output. Hardware modules may also initiate communications with input or output devices, and can operate on a resource (e.g., a collection of information from a computing resource).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module in which the hardware includes one or more processors. Accordingly, the operations described herein may be at least partially processor-implemented, hardware-implemented, or both, since a processor is an example of hardware, and at least some operations within any one or more of the methods discussed herein may be performed by one or more processor-implemented modules, hardware-implemented modules, or any suitable combination thereof.

Moreover, such one or more processors may perform operations in a "cloud computing" environment or as a service (e.g., within a "software as a service" (SaaS) implementation). For example, at least some operations within any one or more of the methods discussed herein may be performed by a group of computers (e.g., as examples of machines that include processors), with these operations being accessible via a network (e.g., the Internet) and via one or more appropriate interfaces (e.g., an application program interface (API)). The performance of certain operations may be distributed among the one or more processors, whether residing only within a single machine or deployed across a number of machines. In some example embodiments, the one or more processors or hardware modules (e.g., processor-implemented modules) may be located in a single geographic location (e.g., within a home environment, an office environment, or a server farm). In other example embodiments, the one or more processors or hardware modules may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and their functionality presented as separate components and functions in example configurations may be implemented as a combined structure or component with combined functions. Similarly, structures and functionality presented as a single component may be implemented as separate components and functions. These and other variations, modifications, additions, and improvements fall within the scope of the subject matter herein.

Some portions of the subject matter discussed herein may be presented in terms of algorithms or symbolic representations of operations on data stored as bits or binary digital signals within a memory (e.g., a computer memory or other machine memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "accessing," "processing," "detecting," "computing," "calculating," "determining," "generating," "presenting," "displaying," or the like refer to actions or processes performable by a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A display device configured as a head up display for displaying information to a user having an eye at an eye position, the display device comprising:
    a hardware processor configured to access encoded holographic data comprising holographic data of an image and lensing data;
    a laser source configured to generate laser light;
    a spatial light modulator (SLM) configured to receive encoded holographic data of the image from the hardware processor, to receive the laser light and to modulate the laser light based on the encoded holographic data of the image; and
    a partially transparent reflective surface disposed adjacent the eye position, the partially transparent reflective surface being configured to receive the modulated laser light, to reflect the modulated laser light towards the eye position, and to form at the eye position an image in the form of a holographic reconstruction based on the modulated laser light, and to provide at the eye position external visible light reflected off a physical object at that is within a field of a view of the display device,
    wherein the lensing data are configured to result in a frequency-space transform of the modulated laser light to provide the holographic reconstruction.

2. The display device of claim 1, wherein the partially transparent reflective surface is a surface of a parabolic lens including a concave side, a convex side, and a partially reflective layer applied to the concave side,
    wherein the parabolic lens forms a focus point located around the eye position,
    wherein the SLM directs the modulated laser light to the partially reflective layer on the concave side of the parabolic lens.

3. The display device of claim 2, further comprising:
an outside layer applied to the concave side of the parabolic lens, the outside layer comprising a polarized element configured to form a transparent element or opaque element in response an electrical signal applied to the polarized element.

4. The display device of claim 3, wherein the electrical signal is based on an identification of a physical object within the field of view of the display device.

5. The display device of claim 3, wherein the electrical signal is based on an identification of a virtual application mode or an augmented or mixed reality mode, the virtual application mode corresponding to the opaque element, the augmented or mixed reality mode corresponding to the transparent element.

6. The display device of claim 1, further comprising:
a display controller coupled to the processor, the laser source, and the SLM, the display controller being configured to:
receive the holographic data of the image from the processor;
generate a first control signal for the laser source; and
generate a second control signal for the SLM based on the holographic data of the image.

7. The display device of claim 1, wherein the hardware processor comprises an augmented reality application configured to:
identify a physical object captured by a camera of the display device;
retrieve an augmented reality content associated with the physical object;
identify a depth of the physical object; and
encode a hologram including a depth of the augmented reality content based on the depth of the physical object, the image including the augmented reality content, the encoded holographic of the image including the depth of the physical object.

8. The display device of claim 1, wherein the SLM is a Liquid Crystal on Silicon Spatial Light Modulator (LCOS-SLM) arranged to spatially modulate phase-only.

9. The device of claim 1, wherein the display device is configured as a wearable head up display.

10. The device of claim 1, wherein the partially transparent reflective surface is within 1 to 5 cm from the eye position.

11. The device of claim 1, wherein the partially transparent reflective surface is a partially transparent reflective lens surface.

12. The device of claim 11, wherein the lensing data and the partially transparent surface are configured to together perform the frequency-space transform of the modulated laser light to provide the holographic reconstruction.

13. The method of claim 12, wherein the lensing data and the partially transparent surface together perform the frequency-space transform of the modulated laser light to provide the holographic reconstruction.

14. A method for using a head-up display device to display information to a user having an eye at an eye position, the method comprising:
generating a laser light with a laser source;
receiving encoded holographic data comprising holographic data of an image and lensing data at a SLM (Spatial Light Modulator) of the display device and modulating the laser light with the SLM based on the encoded holographic data;
reflecting the modulated laser light towards the eye position with a partially transparent reflective surface of the display device disposed adjacent to the eye position and configured to receive the modulated laser light;
providing at the eye position external visible light reflected off a physical object at that is within a field of a view of the display device; and
forming at the eye position image in the form of a holographic reconstruction based on the modulated laser light,
wherein the lensing data result in a frequency-space transform of the modulated laser light to provide the holographic reconstruction.

15. The method of claim 14, wherein the partially transparent reflective surface is a surface of a parabolic lens including a concave side, a convex side, and a partially reflective layer applied to the concave side,
wherein the parabolic lens forms a focus point located around the eye position,
wherein the SLM directs the modulated laser light to the partially reflective layer on the concave side of the parabolic lens.

16. The method of claim 15, wherein an outside layer is disposed on the concave side of the parabolic lens, the outside layer comprising a polarized element configured to form a transparent element or opaque element in response to an electrical signal applied to the polarized element, and
wherein the method comprises switching the polarized element between forming the transparent element and forming the opaque element.

17. The method of claim 16, further comprising:
identifying a physical object within the field of view of the display device,
wherein the switching is based on an identification of the physical object.

18. The method of claim 16, further comprising:
identifying a virtual application mode or an augmented or mixed reality mode at the display device,
wherein the switching is based on an identification of the virtual application mode or the augmented or mixed reality mode, the virtual application mode corresponding to the opaque element, the augmented or mixed reality mode corresponding to the transparent element.

19. The method of claim 11, further comprising:
receiving the holographic data of the image;
generating a first control signal for a laser source based on the image; and
generating a second control signal for the SLM based on the encoded depth data of the image.

20. The method of claim 14, further comprising:
identifying a physical object captured by a camera of the display device;
retrieving an augmented reality content associated with the physical object;
identifying a depth of the physical object; and
encoding a hologram including a depth of the augmented reality content based on the depth of the physical object, the image including the augmented reality content, the encoded holographic data of the image including the depth of the physical object.

21. The method of claim 14, wherein the partially transparent reflective surface is within 1 to 5 cm from the eye position.

22. The method of claim 14, wherein the display device is worn by the user.

23. The method of claim 14, wherein the partially transparent reflective surface is a partially transparent reflective lens surface.

* * * * *